US007971143B2

(12) United States Patent
Santanche et al.

(10) Patent No.: US 7,971,143 B2
(45) Date of Patent: Jun. 28, 2011

(54) SENSEWEB

(75) Inventors: Andre Santanche, Pituba Salvador (BR); Jie Liu, Sammamish, WA (US); Suman K. Nath, Redmond, WA (US); Nissanka B. Priyantha, Redmond, WA (US); Feng Zhao, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1504 days.

(21) Appl. No.: 11/555,177

(22) Filed: Oct. 31, 2006

(65) Prior Publication Data

US 2008/0104530 A1 May 1, 2008

(51) Int. Cl.
*G06F 15/177* (2006.01)

(52) U.S. Cl. ........ 715/736; 715/734; 715/738; 701/207; 701/215

(58) Field of Classification Search .................. 715/764, 715/734, 736–739, 863; 701/117, 200–225
See application file for complete search history.

(56) References Cited

U.S. PATENT DOCUMENTS 5,596,500 A * 1/1997 Sprague et al. ............... 701/213
5,689,717 A * 11/1997 Pritt ............................. 715/234
5,774,362 A * 6/1998 Suzuki et al. ................. 701/208
5,930,474 A 7/1999 Dunworth et al.
5,938,721 A 8/1999 Dussell et al.
5,966,135 A 10/1999 Roy et al.
6,157,930 A * 12/2000 Ballard et al. ........................ 1/1
6,266,611 B1 * 7/2001 Matsubayashi ............... 701/202
6,278,939 B1 * 8/2001 Robare et al. ................. 701/208
6,282,489 B1 * 8/2001 Bellesfield et al. ........... 701/201
6,295,502 B1 * 9/2001 Hancock et al. .............. 701/201
6,404,880 B1 * 6/2002 Stevens .................... 379/221.11
6,408,307 B1 * 6/2002 Semple et al. ........................ 1/1
6,415,291 B2 * 7/2002 Bouve et al. .......................... 1/1
6,498,982 B2 * 12/2002 Bellesfield et al. ........... 701/202
6,539,302 B1 * 3/2003 Bender et al. ................. 701/202
6,609,062 B2 * 8/2003 Hancock ....................... 701/200
6,674,445 B1 1/2004 Chithambaram et al.
6,691,114 B1 2/2004 Nakamura
6,701,514 B1 3/2004 Haswell et al.
6,732,120 B1 * 5/2004 Du ....................................... 1/1
6,735,630 B1 * 5/2004 Gelvin et al. ................. 709/224
6,792,353 B2 9/2004 Lin
6,832,251 B1 * 12/2004 Gelvin et al. ................. 709/224
6,859,831 B1 * 2/2005 Gelvin et al. ................. 709/224

(Continued)

FOREIGN PATENT DOCUMENTS

WO WO 2006014824 A1 2/2006

OTHER PUBLICATIONS

Nath et al. "Challenges in Building a Portal for Sensors World Wide" Oct. 31, 2006.*

(Continued)

*Primary Examiner* — Ba Huynh
(74) *Attorney, Agent, or Firm* — Lee & Hayes, PLLC

(57) ABSTRACT

Senseweb is described. In an embodiment, a first selection identifying a region of interest is recognized. Additionally, a second selection indicating at least one selected condition potentially monitored within the region of interest is recognized. Then, at least one sensor in the region of interest monitoring the selected condition is identified, and data communicating the selected condition from the sensor is automatically associated with a representation of the region of interest.

20 Claims, 15 Drawing Sheets

U.S. PATENT DOCUMENTS

| | | | | |
|---|---|---|---|---|
| 6,862,528 | B2 * | 3/2005 | Scannell | 702/3 |
| 6,871,137 | B2 * | 3/2005 | Scaer et al. | 701/200 |
| 6,885,937 | B1 * | 4/2005 | Suranyi | 701/208 |
| 6,901,560 | B1 * | 5/2005 | Guerlain et al. | 715/833 |
| 6,985,929 | B1 * | 1/2006 | Wilson et al. | 709/217 |
| 6,993,430 | B1 * | 1/2006 | Bellesfield et al. | 701/202 |
| 7,003,737 | B2 | 2/2006 | Chiu et al. | |
| 7,036,085 | B2 * | 4/2006 | Barros | 715/764 |
| 7,050,815 | B2 * | 5/2006 | I'Anson et al. | 455/456.1 |
| 7,076,505 | B2 * | 7/2006 | Campbell | 1/1 |
| 7,133,800 | B2 * | 11/2006 | Delin et al. | 702/125 |
| 7,158,373 | B2 * | 1/2007 | Smith | 361/679.18 |
| 7,251,561 | B2 * | 7/2007 | Dotan et al. | 701/207 |
| 7,289,923 | B2 * | 10/2007 | Marovitz | 702/100 |
| 7,302,343 | B2 * | 11/2007 | Beatty | 701/214 |
| 7,349,773 | B2 * | 3/2008 | Berard | 701/3 |
| 7,360,158 | B1 * | 4/2008 | Beeman | 715/705 |
| 7,373,244 | B2 * | 5/2008 | Kreft | 701/207 |
| 7,388,519 | B1 * | 6/2008 | Kreft | 340/995.24 |
| 7,461,528 | B2 * | 12/2008 | Taniguchi et al. | 70/207 |
| 7,532,979 | B2 * | 5/2009 | Fuchs | 701/209 |
| 7,545,376 | B2 * | 6/2009 | Hintz | 345/440 |
| 7,555,387 | B2 * | 6/2009 | Sladky et al. | 701/211 |
| 7,574,428 | B2 * | 8/2009 | Leiserowitz et al. | 1/1 |
| 7,589,958 | B2 * | 9/2009 | Smith | 361/679.02 |
| 7,599,792 | B1 * | 10/2009 | Smith | 701/209 |
| 7,599,957 | B2 * | 10/2009 | Liu et al. | 1/1 |
| 7,610,560 | B2 * | 10/2009 | Horvitz et al. | 715/764 |
| 2001/0014185 | A1 | 8/2001 | Chitradon et al. | |
| 2002/0111146 | A1 * | 8/2002 | Fridman et al. | 455/99 |
| 2004/0008125 | A1 | 1/2004 | Aratow et al. | |
| 2004/0039517 | A1 * | 2/2004 | Biesinger et al. | 701/117 |
| 2005/0130671 | A1 | 6/2005 | Frank et al. | |
| 2005/0222810 | A1 * | 10/2005 | Buford et al. | 702/183 |
| 2005/0222811 | A1 * | 10/2005 | Jakobson et al. | 702/183 |
| 2005/0222895 | A1 * | 10/2005 | Jakobson et al. | 705/10 |
| 2006/0129691 | A1 * | 6/2006 | Coffee et al. | 709/230 |
| 2006/0136090 | A1 * | 6/2006 | Koromyslov et al. | 700/200 |
| 2006/0161645 | A1 * | 7/2006 | Moriwaki et al. | 709/223 |
| 2006/0242580 | A1 * | 10/2006 | Obradovich | 715/700 |
| 2006/0247846 | A1 * | 11/2006 | Cera et al. | 701/118 |
| 2006/0253246 | A1 * | 11/2006 | Cera et al. | 701/117 |
| 2007/0038934 | A1 * | 2/2007 | Fellman | 715/700 |
| 2007/0050157 | A1 * | 3/2007 | Kahn et al. | 702/55 |
| 2007/0162761 | A1 * | 7/2007 | Davis et al. | 713/182 |
| 2007/0208494 | A1 * | 9/2007 | Chapman et al. | 701/117 |
| 2008/0022217 | A1 * | 1/2008 | Aspen | 715/764 |
| 2008/0051994 | A1 * | 2/2008 | Fisher et al. | 701/210 |
| 2008/0062167 | A1 * | 3/2008 | Boggs et al. | 345/419 |
| 2008/0071465 | A1 * | 3/2008 | Chapman et al. | 701/117 |
| 2008/0088462 | A1 * | 4/2008 | Breed | 340/573.1 |
| 2008/0091461 | A1 * | 4/2008 | Evans et al. | 705/1 |
| 2008/0094212 | A1 * | 4/2008 | Breed | 340/541 |
| 2008/0247313 | A1 * | 10/2008 | Nath et al. | 370/231 |
| 2008/0301120 | A1 * | 12/2008 | Zhu et al. | 707/5 |

OTHER PUBLICATIONS

Santanche et al. "SenseWeb: Browsing the physical world in Real time" 2005.*

Delin et al. "The Sensor Web: A distributed, Wireless Monitoring System" Apr. 2004 Published SensorMag.com.*

Wikipedia.org et al. "Sensor Web" retrieved Mar. 2010.*

Chu et al. "Open Sensor Web Architecture: Core Services" Dec. 2005.*

Chu et al. "Service Oriented Sensor Web", 2005.* www.veryspatial.com. "SensorMap From Microsoft Research" Aug. 2006.*

Fisher, "An Authoring Toolkit for Mixed Reality Experiences", Keio University, Proceedings of IWEC '02 (International Workshop on Entertainment Computing), Makuhari, Japan, May 14-17, 2002, 8 pages.

Fisher, "Environmental Media: Accessing Virtual Representations of Real-Time Sensor Data and Site-specific Annotations Embedded in Physical Environments", Keio University, Proceedings of the Seventh International Conference on Virtual Systems and Multimedia (VSMM'01), Oct. 25-27, 2001, 15 pages.

O'Sullivan, et al., "Capturing Task Knowledge for Geo-Spatial Imagery", K-CAP '03, ACM, Oct. 23-25, 2003, pp. 78-87.

"OpenGIS Reference Model", Open GIS Consortium Inc., Reference No. OGC 03-040, Version 0.1.2, Mar. 4, 2003, 99 pages.

* cited by examiner

SENSEWEB

BACKGROUND

Geocentric web interfaces are useful in visualizing spatially and geographically related data. For example, a number of Internet-based mapping services allow users to view street maps or satellite photographs of a location by the user providing an address for the location of interest. Similarly, weather services allow users to specify a city or region of interest, and will present a weather map or a satellite weather image of the specified city or region. Thus, by directing content from a website maintained by one of these content-specific services to a browser allows users to review maps or other views that present the desired content.

Researchers make use of many different types of networked remote sensors to gather information about myriad different types of location data. In addition to weather data, sensors are used to monitor seismic activity, ambient solar or other radiation, traffic densities, concentrations of pollutants or other chemicals, and many other types of information. In seeking to present the data gathered by these devices, researchers devise their own, ad hoc solution to attempt to overlay the data from their own, known sensors over a visual representation of the location of interest. Typically, these solutions require a researcher or another operator to manually edit the representation or create a separate overlay for the representation to show the data reported by the sensor or associate a link to the sensor source for every sensor the researcher wishes to represent in the location.

SUMMARY

This summary is provided to introduce simplified concepts of senseweb, which is further described below in the Detailed Description. This summary is not intended to identify essential features of the claimed subject matter, nor is it intended for use in determining the scope of the claimed subject matter.

In an embodiment of senseweb, a first selection identifying a region of interest is recognized. Additionally, a second selection indicating at least one selected condition potentially monitored within the region of interest is recognized. Then, at least one sensor in the region of interest monitoring the selected condition is identified, and data communicating the selected condition monitored by the sensor is automatically associated with a representation of the region of interest. Further data from the sensor may be continuously received and communicated along with the region of interest.

In one exemplary implementation, recognizing the first selection of the region of interest includes receiving a polygonal definition circumscribing the region of interest on a map. Similarly, in another exemplary implementation the selected condition potentially monitored includes a weather condition, such as an air temperature, a humidity, a barometric pressure, or a wind speed monitored by one or more sensors in the region of interest.

BRIEF DESCRIPTION OF THE DRAWINGS

The detailed description is described with reference to the accompanying figures. In the figures, the left-most digit of a three-digit reference number or the two left-most digits of a four-digit reference number identify the figure in which the reference number first appears. The use of the same reference numbers in different figures indicates similar or identical items.

DETAILED DESCRIPTION

Overview

Embodiments of senseweb are described in which sensors can be registered, indexed, and organized according to client queries such that conditions being monitored by the sensors can be visualized in real time. For example, in one embodiment of senseweb, a user may identify, in one example using a browser operating on a client computer or electronic device, a region of interest in which information of a certain type being monitored by sensors is desired. At least one sensor monitoring the desired type of information in the region of interest can be identified, and the information can be continuously, automatically and simultaneously displayed on a visual representation of the region of interest, in a location on a display corresponding to the physical location where the information was monitored by the sensor.

While aspects of the described systems and methods for senseweb can be implemented in any number of different computing systems, environments, television-based entertainment systems, and/or configurations, embodiments of senseweb are described in the context of the following exemplary system architecture(s) and elements.

Exemplary Network Environment

Figure 1:
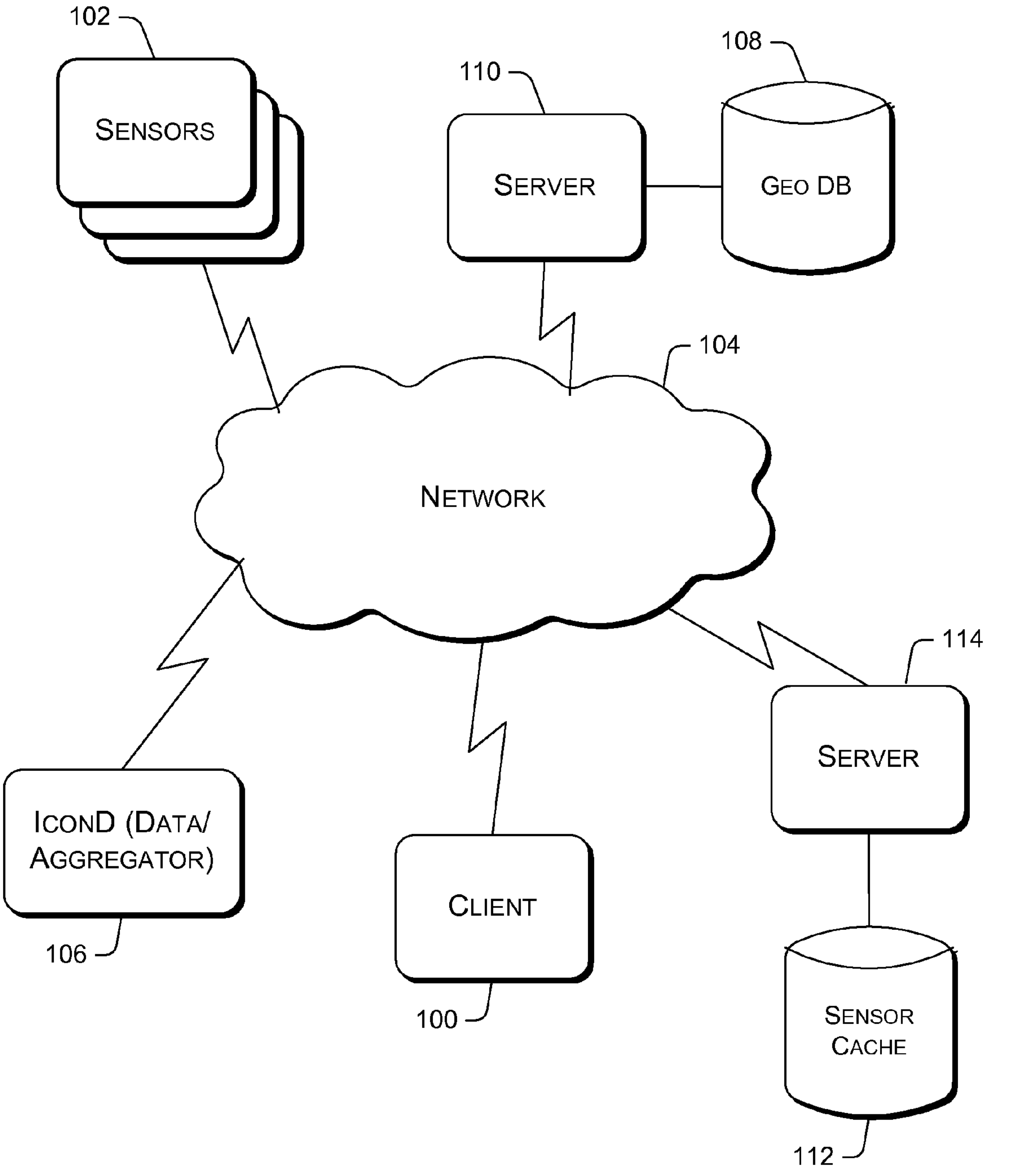
FIG. 1 illustrates an exemplary network in which a senseweb system can be implemented.

FIG. 1 illustrates an exemplary network environment supporting operation of an embodiment of a senseweb system. In this exemplary environment, a query is transmitted from browser or other application being executed on a client 100 (also referred to herein as a client electronic device, examples include a networked computer, laptop, PDA, or any electronic device) requesting information from one or more types of sensors 102 monitoring a selected condition in a particular region of interest. For example, the query may include a request to find all sensors monitoring ambient air temperature within a region of interest. The query may specify the region of interest in one of a number of ways, as described further below. In one embodiment, the client 100 may facilitate the presentation of a query using a number of interfaces, and may be implemented with a JavaScript library running in one or more web browsers.

The query transmitted from the client 100 may be transmitted through a network 104, examples of which include but are no limited to the Internet, a wide area network (WAN), a local area network (LAN), or any other type of network. In one mode, the query is received by a server/aggregator 106, which may be of a location remote from client 100 or integrated within client 100, where the query is serviced by a query manager. As described in more detail below, the server/aggregator 106 may access a GeoDB 108, a sensor database that maintains metadata regarding available sensors 102. The metadata includes information about each of the sensors that is used to identify which of the sensors 102 may be relevant to a particular query.

In other words, metadata associated with a sensor may include properties of the sensor useful in indexing and locating the sensor. For example, metadata for each sensor can include a name of the sensor, a sensor type specifying a condition or type of data that is monitored by the sensor, and a data type reflecting the form of the data produced by the sensor. The metadata also may include a location of the sensor, such as a physical location or region where the sensor is positioned expressed in terms such as latitude, longitude, altitude, a street and/or building address, or another coordinate identifier. The metadata also may include various kinds of descriptions of the sensor, examples of which may include short or long descriptions that denote a model identifier, a range of operational capabilities, a sensitivity indicator, sensor or system maintenance information, or other characteristics of each sensor. The metadata also includes a network address from which data collected by the sensor may be accessed or retrieved, such as a uniform resource indicator (URI) or uniform resource locator (URL) for the sensor itself, or for a data storage device from which the data monitored by the sensor can be retrieved. The metadata may include other forms of information about the sensors, and the preceding list is provided by way of example, rather than by way of limitation.

For each of the sensors 102 tracked by the GeoDB 108, the metadata may include the type of data the sensor measures, the sensor's physical location, and the sensor's network address, such as its uniform resource locator (URL) or uniform resource identifier (URI), or another network location from which the data the sensor monitors can be read or retrieved. Using the metadata, for example, users can place queries to identify which of the sensors 102 monitor a selected condition in a particular region of interest.

In one implementation, the metadata for each of the sensors 102 is stored in records or another format in the GeoDB 108. Additionally, sensor metadata may be grouped into directory or table entries. Each of the directory or table entries provides information regarding each sensor, such as a location or address of the sensor, and at least one condition being monitored by the sensor. Such directories may be compiled by registering the location and/or address of each sensor as well as the condition or conditions monitored by the sensor. Moreover, in one possible implementation, a plurality of available sensors may be registered through the use of an ontological language specifying metadata describing each of the available sensors.

The GeoDB 108 may be coupled to the network 104 via a server 110. It will also be understood that the GeoDB 108 may poll the sensors 102 periodically or upon receipt of an interrupt signal to collect metadata regarding each of the sensors 102, or the sensors 102 may send their metadata automatically to the GeoDB 108 once the sensors 102 become operational and/or are coupled to network 104.

In one exemplary implementation, the GeoDB 108 is a portal for registering sensor metadata, including a database tuned for indexing and quickly searching geocentric records. This can be implemented, for example, using structured query language (SQL) database. As is understood in the art, the use of an SQL database allows for flexible searching and querying of the data, such that a user will be able to identify sensors according to his or her own specified criteria from among any of the types of metadata maintained for each of the sensors.

Once one or more of the sensors 102 relevant to a user's query have been identified using the metadata stored at the GeoDB 108, portions or all of the corresponding metadata for the sensors 102 may be directed to a server/aggregator 106. The server/aggregator 106 collects data from the sensors 102, or from a cache or other storage where directory information is stored. A network address from which the sensor data can be retrieved may be included in the metadata, whether that address identifies the network address for the sensor or a cache or server that collects and maintains the data from each of the sensors. In one implementation, the server/aggregator 106 links to a data source or incorporates data from the sensors 102 in a representation of the region of interest, as further discussed below. Alternatively, the client 100 may be provided with the network addresses from which the sensor data may be collected as well as information identifying the location of the sensors 102 relative to a region of interest. In this implementation, the client 100 collects the sensor data from the sensors 102 or a store of sensor data, and then links a source of the sensor data to or incorporates the sensor data in a representation of the area of interest.

As previously mentioned, instead of either the server/aggregator 106 or the client 100 linking to the sensors 102 directly, sensor data may be cached in one or more common repositories, such as a sensor cache 112. The sensor cache 112 may be coupled to a server 114, which is coupled to network 104. Data from the sensors 102 may be cached at regular or irregular intervals. The transfer of data can be initiated by the sensors 102, or the sensors 102 may present their data upon being queried or polled by the sensor cache 112 and/or the server 114. In such an implementation, the server/aggregator 106 and/or the client 100 can collect sensor data from the sensor cache 112, without having to query or poll each of the relevant individual sensors among the plurality of sensors 102. In one exemplary implementation, an address of the device caching the sensor data, including a hub address, can be stored within a directory at GeoDB 108 associated with the sensor for which the data is being cached. Sensor data alternatively may be stored or cached in other devices coupled to the network 104, such as at the server 110 or the GeoDB 108.

Using the sensor data from the sensors 102 and the metadata storing information about the sensors 102, the server/aggregator 106 or client 100 can using a browser, media player or other application software create on a display of client 100 a visual representation of the region of interest presenting the sensor data. In one exemplary implementation, the client 100 accesses or generates a representation of the region of interest in the form of a map. Individual icons are situated on the map or other representation of the region of interest to represent the presence and/or position of the sensors 102 that monitor a condition specified in the query within the region of interest. In one implementation, the location of each icon generally corresponds with an actual physical location within the region of interest being represented where the sensor is situated.

Each of the icons may present information associated with the sensor, including a location and/or address of the sensor, as well as the data monitored by the sensor and the time the sensor data was recorded. Alternatively, the icon may include a selectable icon. By selecting the selectable icon with a user input device, e.g. a pointing device, such as by clicking on or moving a display curser over the icon, the icon may be activated to present information about the sensor, such as at least a portion of the metadata describing the sensor, and sensor data monitored by the sensor.

In another implementation, the server/aggregator 106 includes an integrator configured to generate a representation of the region of interest specified by the query and insert icons representing or corresponding with the sensors 102 within the representation. In this implementation, the completed representation of the region of interest, including the icons representing the sensors 102, is prepared for and presented to the client 100. The server/aggregator 106 may include an associator configured to link each of the icons representing the sensors with a network address for the sensor or a store of sensor data to permit the client to associate or present the sensor data for each of the sensors 102.

One ordinarily skilled in the art will understand that the sensors 102 may include one or more physical devices or systems deployable at any location to collect physical measurements. The sensors 102 may include environmental sensors to monitor video or audio conditions, such as still-image or motion-video cameras or microphones, each of which may be capable of capturing data both within and beyond the range of human detection. Thus, the sensors 102 may include infrared, ultraviolet, or visible spectrum cameras, or microphones capable or sensing sounds below, within, or beyond the limits of human hearing. The sensors 102 also may monitor weather conditions, such as air temperature, humidity, barometric pressure, sunlight, cloud cover, wind speed and accumulated precipitation. The sensors 102 may measure geological conditions such as seismographic conditions and ground temperatures. The sensors 102 may include devices monitoring light intensity. Additionally, the sensors 102 may include devices configured to monitor a presence or an absence of a chemical, or a relative concentration of a chemical, such as are used to measure air or water quality. Moreover, the sensors 102 can include devices configured to monitor human or vehicle traffic density by tabulating a number of persons or vehicle to enter or pass a chosen location, respectively.

The sensors 102 can also include one or more virtual devices or systems, such as computational agents deriving real time information from other direct or indirect sensors. In one exemplary implementation, an indirect sensor includes a video processing computation configured to infer a traffic condition from video information captured by one or more cameras on a given road.

The sensors 102 can also include a data interface and a metadata interface implementable through use of web services. The data interface can be used to allow devices such as web clients to obtain sensor data, such as a time value pair, where time can denote a time instance or duration in which sensor data is collected, and value may denote the data itself. Examples of values include scalars, waveforms including sequences of samples, images, and video segments.

Exemplary Architecture

Figure 2:
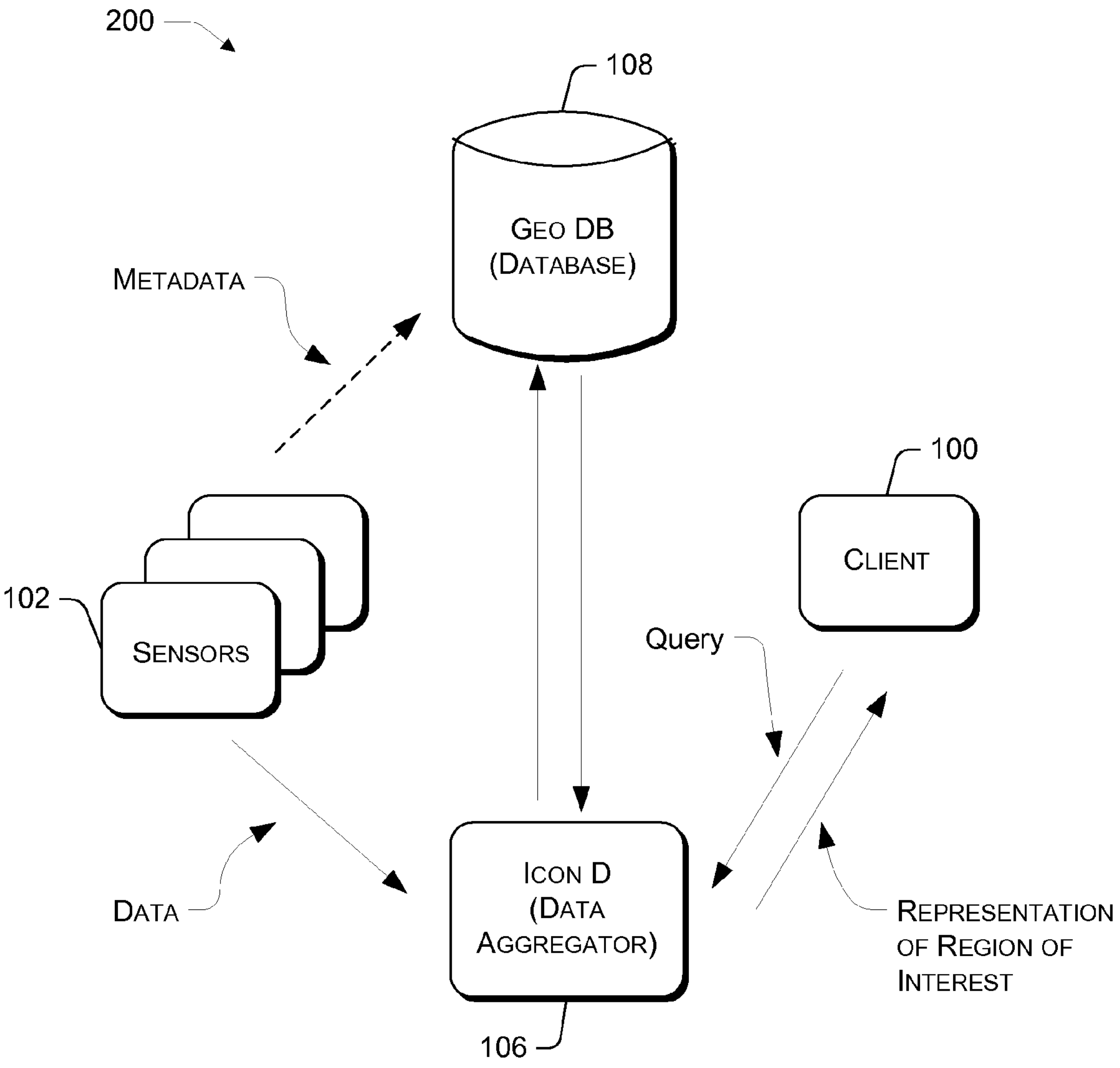
FIG. 2 illustrates an exemplary architecture of a senseweb system.

FIG. 2 illustrates an exemplary architecture of a system in which senseweb may be implemented. The architecture 200 includes the client 100, the sensors 102, the server/aggregator 106, and the GeoDB 108 as described in conjunction with FIG. 1 above.

Figure 3:
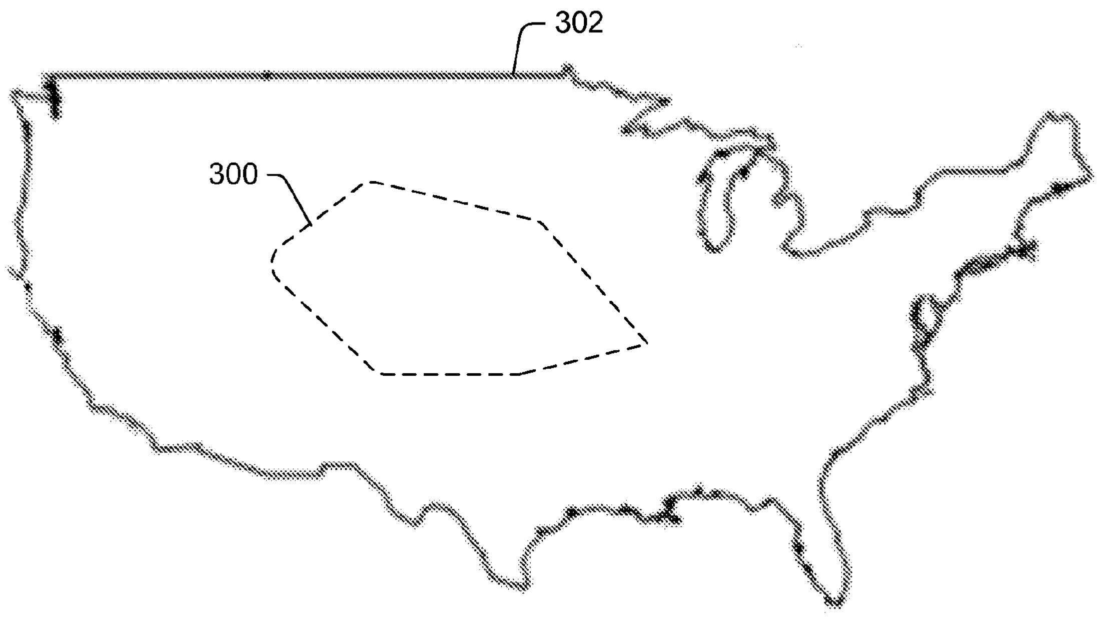
FIGS. 3-6 illustrate exemplary embodiments of senseweb in which clients may select regions of interest using graphical interfaces.

In one exemplary implementation, a user of the client 100 can formulate a query to locate all sensors monitoring a desired condition within a region of interest. The region of interest can be designated by the user in many different ways. For example, as illustrated in FIG. 3, the user can designate a polygonal region 300 by specifying the boundaries of the polygonal region on a given map 302, such as by drawing the region 300 using graphical user interface tools. The polygonal region 300 can be described using any technique known in the art, including tracing the bounds of the region using a cursor.

Figure 4:
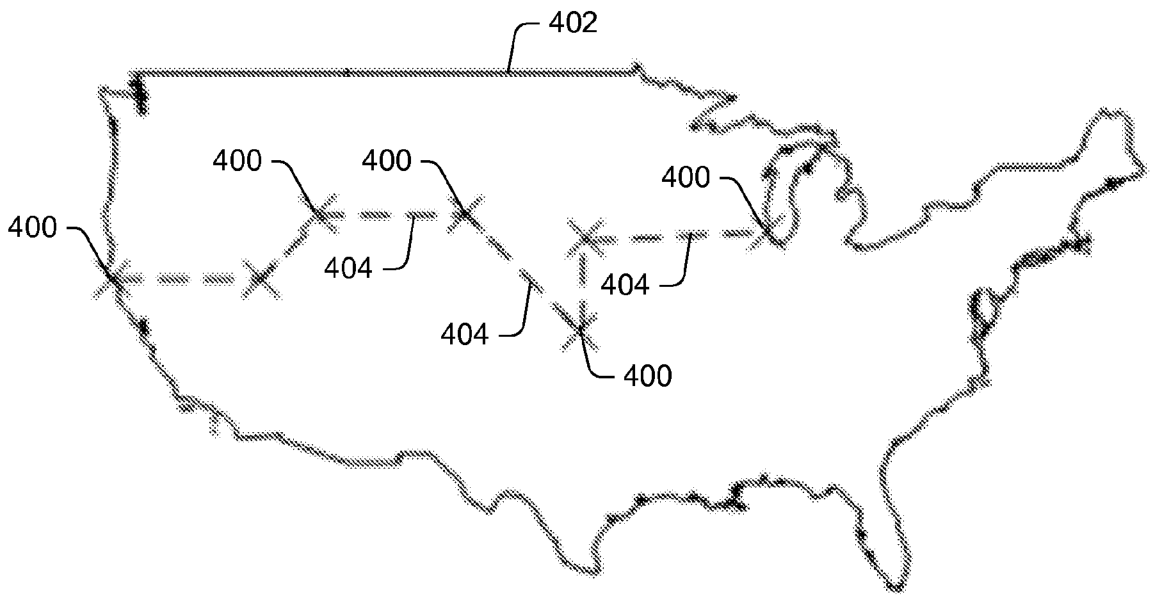

Alternately, as illustrated in FIG. 4, the user can designate a path definition that represents a region of interest corresponding, for example, to an intended route of travel. The user can designate the path by designating several points of interest 400 on a given map 402. A path 404 including line segments between the points 400 can then be determined in several ways. For example, the path 404 can be the shortest distance between adjacent points 404. Alternately, the path 404 can coincide with roadways, or air corridors between the adjacent points 400. For example, a user planning a driving trip may select points of interest 400 from the map 402 that correspond with cities or towns to be visited during the trip. A choice of possible routes may then be presented to the user in the form of various paths 404 between the points 400 corresponding to various available roadways between the points 400, such as freeways, interstate highways, scenic routes, and historic routes. The user may then be afforded the option of choosing a desired path 404 from among all paths suggested by cursor action on the desired path, such as by clicking on desired segments of the path 404.

The user may also be afforded an opportunity select an area adjacent to the path 404. For example, through use of pull-down menus and/or other user interfaces known in the art, the user may be able to specify a zone of interest extending from path 404. In one exemplary implementation, the user can indicate that the region of interest should include an area within a specified range of the path, such as an area within ten miles to the south of path 404 and/or five miles to the north of path 404.

Figure 5:
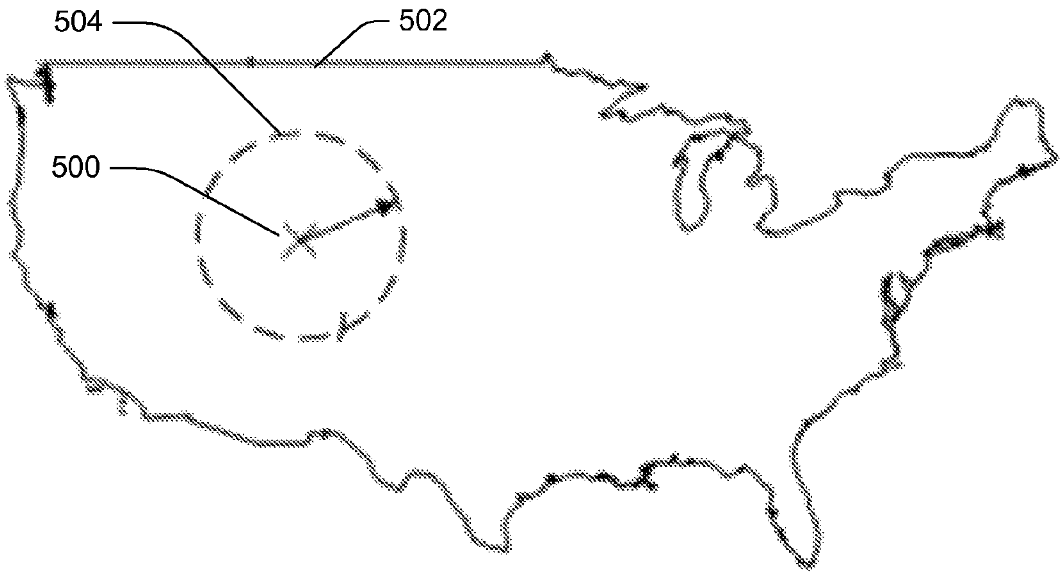

FIG. 5 illustrates yet another possible way for a user to select a region of interest. As shown, the user may select a point of interest 500 from a map 502. For example, the user may be able to click on the point 500, or enter an address or coordinate using any coordinate system. The user can then designate a radius of interest from the point 500. For example, the user may choose the point 500 corresponding to a town or other location, and specify a radius of interest 504 of fifty miles. Thus, in the example of FIG. 5, the user designates a region of interest to be everything within a fifty miles radius of the chosen point 500.

Figure 6:
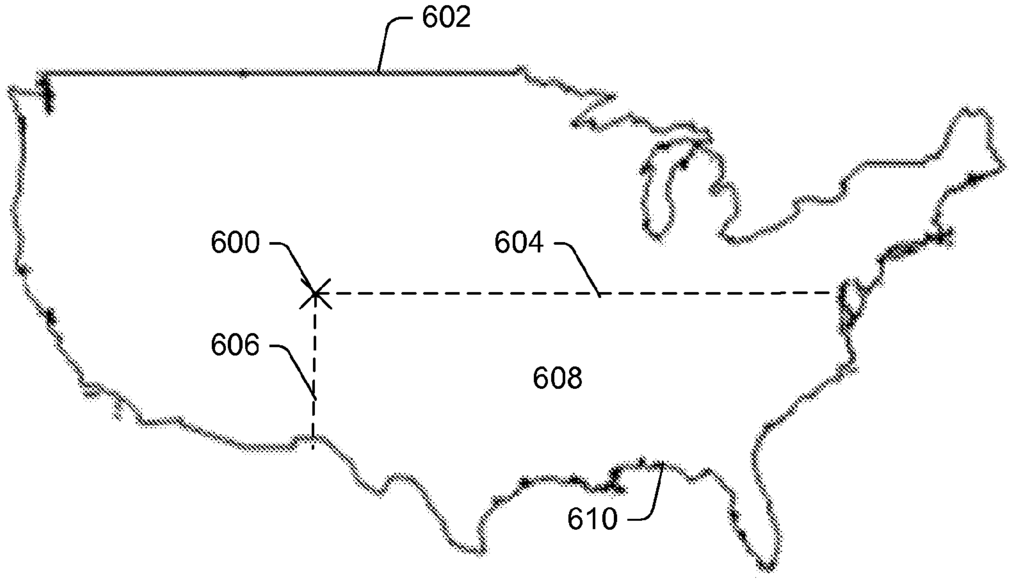

FIG. 6 illustrates yet another possible way for a user to select a region of interest. As shown, the user may select a point of interest 600 from a map 602. The user may then select boundary limits originating from the point 600. For example, the user may designate a boundary limit 604 running due east from the point 600. Similarly, the user may select another boundary limit 606 running due south from the point 600. In this way, a region of interest 608 may be defined as a region between a border 610 of map 602, and boundary limits 604 and 606.

Boundary limits 604 and 606 may be of any configuration. For example, boundary limits can be set at any angle from the point 600. In one exemplary implementation, the boundary limit 604 could be set in a northeasterly direction by specifying that boundary limit 604 originate at the point 600 and extend sixty degrees clockwise from a compass reference, such as north. In a similar manner, the boundary limit 606 could be set to originate at the point 600 and run in any orientation around the point 600.

Moreover, boundary limits 604 can be set manually by the user. For example, in one implementation, the user can create the boundary limits 604 and 606 by moving a cursor from the point 600 to the border 610 of map 602. In this way boundary limits 604 and 606 need not be linear, such as the boundary limits 604 and 606 shown in FIG. 6. Instead the boundary limits 604 and 606 may curve in any fashion desirable to the user, such as to follow a desired roadway, or to include a terrain feature of interest.

Figure 7:
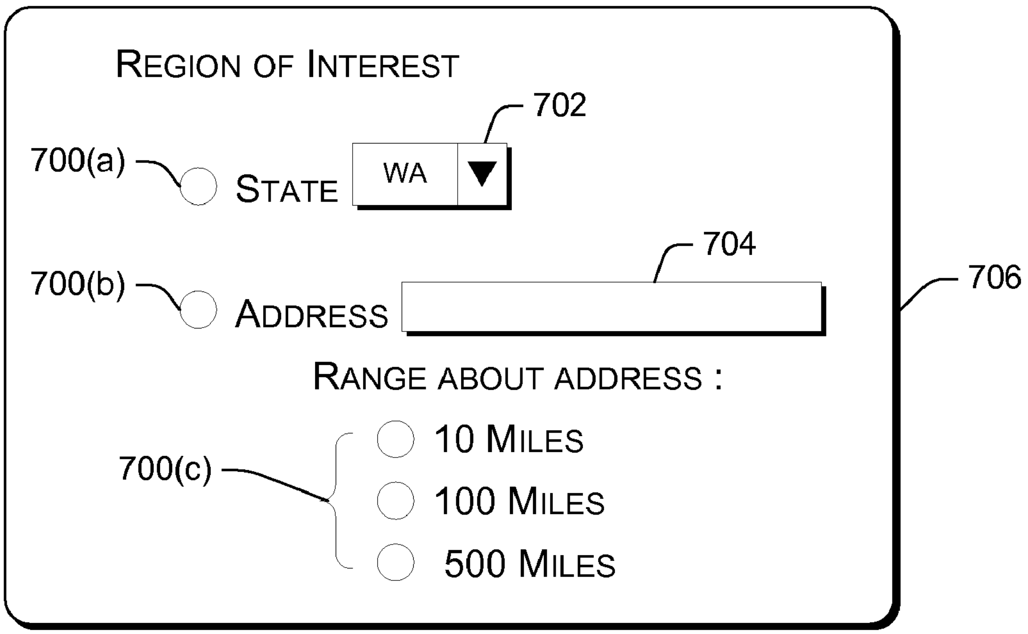
FIG. 7 illustrates an exemplary embodiment of senseweb in which a client may select a region of interest using a textual interface.

FIG. 7 illustrates yet another possible way a user can designate a region of interest, such as by presenting a textual definition of the region of interest. As shown, the user may interact with various buttons 700, pull down menus 702, and fields 704 or any combination thereof presented in a text-based user interface 706. For example, as shown in FIG. 7, the user may click a state button 700(*a*) and choose a desired state from the pulldown menu 702. Alternately, the user could choose to enter a street address by selecting the button 700(*b*) and enter the desired address in the field 704. A radius about the chosen address can also be selected by using the buttons 700(*c*).

Through the use of buttons, pulldown menus, fields and other user interface tools known in the art, the user can be afforded the opportunity to enter a wide variety of information, including geographic coordinates, landmarks of interest, street intersections, and any other information useful in designating a region of interest or portions thereof.

Moreover, it will be understood that any of the user interfaces displayed in FIGS. 3-7 may be combined. For example, the point 600 in FIG. 6 may be entered as an address in a field, such as the field 704, while the limits 604 and 606 may be entered through cursor actions. In this way, the user can be afforded many convenient ways to specify a region of interest or portions thereof.

Returning to FIG. 2, the user can also enter into the query on the client for processing by the client or for transmission to the server a desired condition being monitored by sensors. This can be entered before or after the region of interest is entered, and can include any condition capable of being monitored by sensors 102, including temperature, humidity, light density, traffic density, air quality, and so on. Alternatively or additionally, the user could enter a type, or model, of sensor desired.

The finished query may then be transmitted from the client 100 to the server/aggregator 106. The server/aggregator 106 can then use the terms included in the query to cause a search to be conducted at the GeoDB 108 for metadata indicating the presence of sensors of the type specified by the user, and/or sensors which are monitoring the condition of interest, in the selected region of interest. This search can be conducted by examining metadata stored in GeoDB 108 which was transmitted or collected from sensors 102. As noted above, metadata can indicate the type, location and/or address of an individual sensor. By searching metadata at the GeoDB 108, all of the sensors sought by the query in the region of interest, or which monitor a selected condition in the region of interest, can be located and the locations and/or addresses of the sensors can be sent to, or collected by, the server/aggregator 106.

The server/aggregator 106 can then transmit the locations and/or addresses of the sensors 102 to the client 100, such that the client 100 can itself query the sensors 102 for data they have collected regarding the selected condition of interest. The client 102 can also create a representation, such as a map, including the region of interest, and place icons representing the sensors 102 onto the representation. These icons can be automatically (without user intervention) placed in locations on the representation corresponding to the physical location of the condition being monitored by each sensor as indicated by the metadata associated with each of the sensors 102 that are relevant to the query. The icons can also include a link to the sensors they represent, such that data being collected by the sensors, and the times at which the data were collected can be continuously displayed and updated within or adjacent to the icons. Alternately, such data can be displayed when the user selects the icon, such as by clicking on the icon or moving the cursor over the icon.

Figure 8:
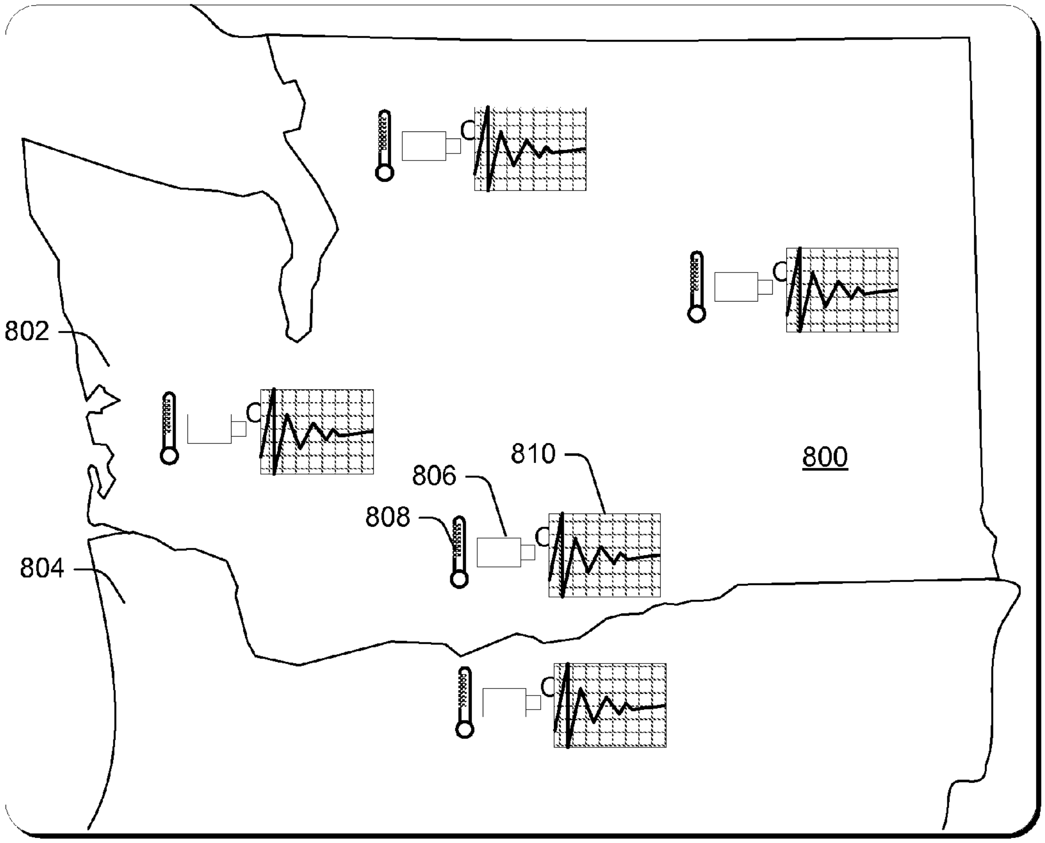
FIG. 8 illustrates an exemplary embodiment of senseweb in which sensors monitoring different types of conditions in a selected region of interest are represented by unique icons.

FIG. 8 shows possible output of senseweb, including a representation 800 of an area of interest including several icons corresponding to sensors monitoring conditions of interest in the area of interest. In this exemplary implementation, the representation 800 of the area of interest includes the State of Washington 802 and a portion of the State of Oregon 804. Several icons 806, 808, 810 representing a variety of monitored conditions are shown in representation 800. These icons include a camera 806, which can indicate, for example, that the sensors associated therewith is monitoring visual or audio data. Some examples of visual and/or audio data might include webcams, traffic cameras, streamed video generating devices, audio microphones and so on. Another type of icon included in representation 800 of the region of interest is a thermometer icon 808, which can indicate, for example, that the sensor with which icon 808 is associated monitors a temperature, such as an air or water temperature. Seismic icons 810 are also included in representation 800 of the region of interest, which indicate that one or more seismic conditions are being monitored by the sensors represented by the icons 810.

The position of the icons 806, 808, 810 on the representation 800 can also convey relevant information. For example, in one possible implementation, the positions of the icons 806, 808, 810 on the representation 800 can indicate the relative physical and or geographical locations of the sensors represented by the icons 806, 808, 810. Alternately, in another implementation, the positions of the icons 806, 808, 810 on the representation 800 can indicate the relative physical and/or geographical locations where conditions are monitored by the sensors represented by the icons 806, 808, 810.

In a similar manner, the representation 800 of the region of interest may be populated with a wide variety of icons indicating sensors monitoring any condition known in the art. For example, although not shown in FIG. 8 for the sake of graphic clarity, icons such as automobiles, that represent traffic congestion sensors, or clouds, that represent weather condition sensors, may also be situated in the representation 800 of the region of interest. Further sensor information associated with the icon may be automatically and continuously updated in real time based on information from sensors 102.

Figure 9:
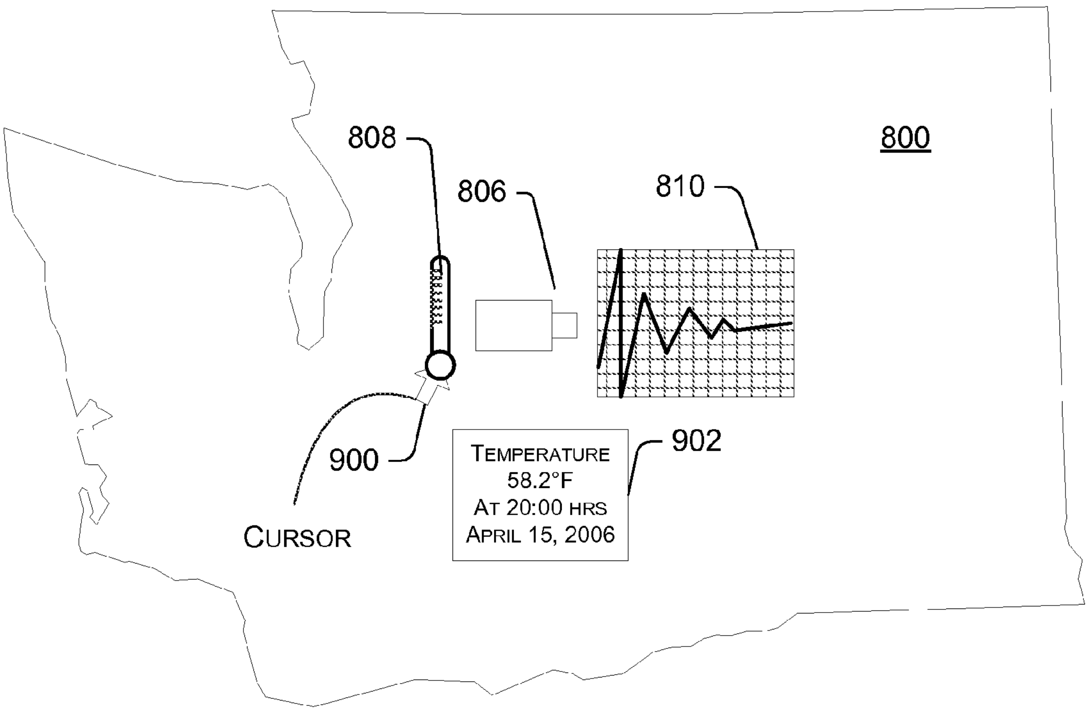
FIG. 9 illustrates an exemplary embodiment of senseweb in which data monitored by a sensor is presented through client selection of an icon corresponding to the sensor.

FIG. 9 illustrates how a user can interact with an icon to display a condition monitored by a sensor represented by the icon. For example, a user may place a cursor 900 over the thermometer icon 808, thus effecting the display of a data window 902, including the data being monitored by the sensor associated with the icon 808. This data may include a temperature, a time that the temperature data was measured, and many other useful pieces of information, including where geographically the temperature was measured along with the technology used to make the measurement. The data window may also display and render media data such as audio data and/or video data. Alternately, the user may bring up the data window 902 by clicking on the icon 808 using the cursor 900. Similarly, the data window 902 may be collapsed out of view by moving the cursor 900 away from the icon 808, or by clicking on the icon 808 or the data window 902.

In a similar fashion, the data windows may be brought up for other icons 808 on the representation 800, as well as for other types of icons 806, 810 on representation 800 of the selected region of interest.

Exemplary Aggregation of Individual Sensor Values

Figure 10:
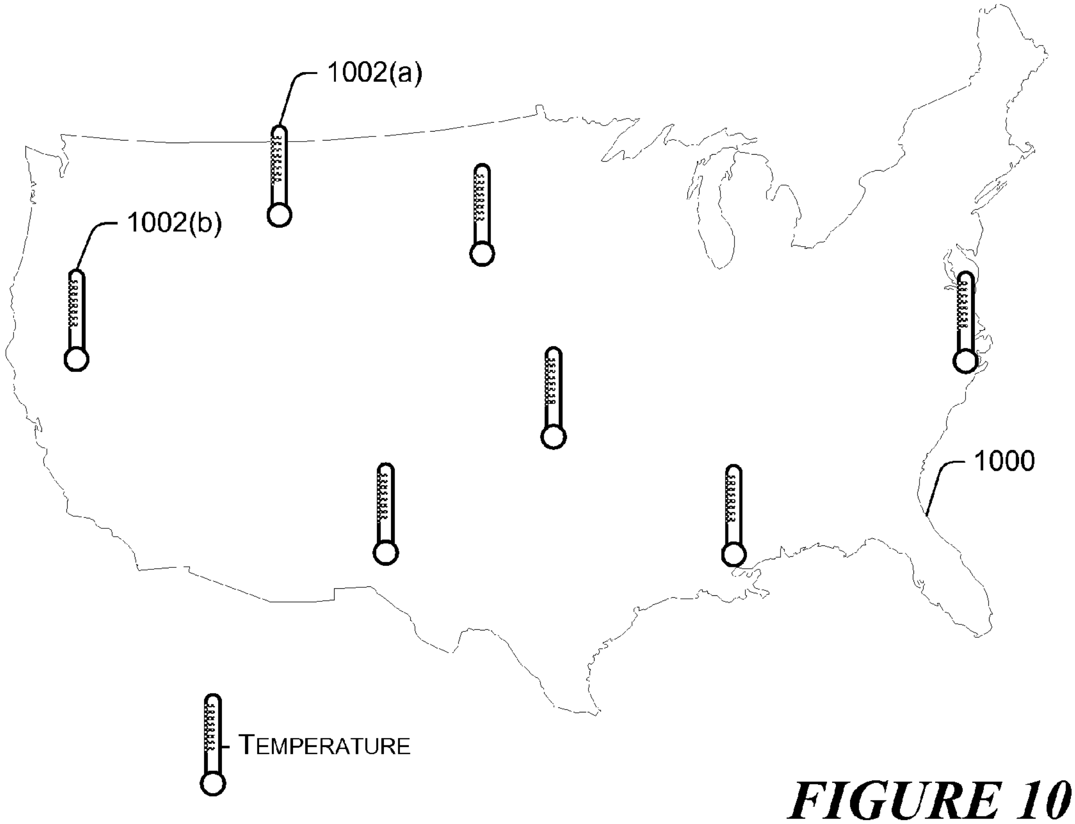
FIG. 10 illustrates an exemplary embodiment of senseweb in which data monitored by multiple individual sensors in a region is aggregated into a single icon.

FIG. 10 illustrates an exemplary implementation of senseweb in which values from individual sensors may be aggregated. Aggregation can occur when so many sensors monitoring a condition of interest are found in a particular region of interest that representing each individual sensor with an icon is impracticable. For example, if there are too many icons in the representation of the region of interest, the icons may overlap one another, making selection of a particular icon or review of the data provided by individual icons difficult or impossible. In addition, presentation of too many individual icons may visually clutter the representation to the point that it becomes difficult for the user to meaningfully or conveniently review the information presented by the representation of the region of interest.

One possible solution to an overabundace of icons is the clustering of some of the individual sensors into a single icon. For example, in one implementation, a map 1000 can include one or more icons 1002 representing clusters of sensors monitoring a condition in a given area. As an example, icon 1002 (*a*) can represent an average, a mean, a median, or otherwise aggregated value from a number of sensors monitoring a selected condition in the Pacific Northwest.

Figure 11:
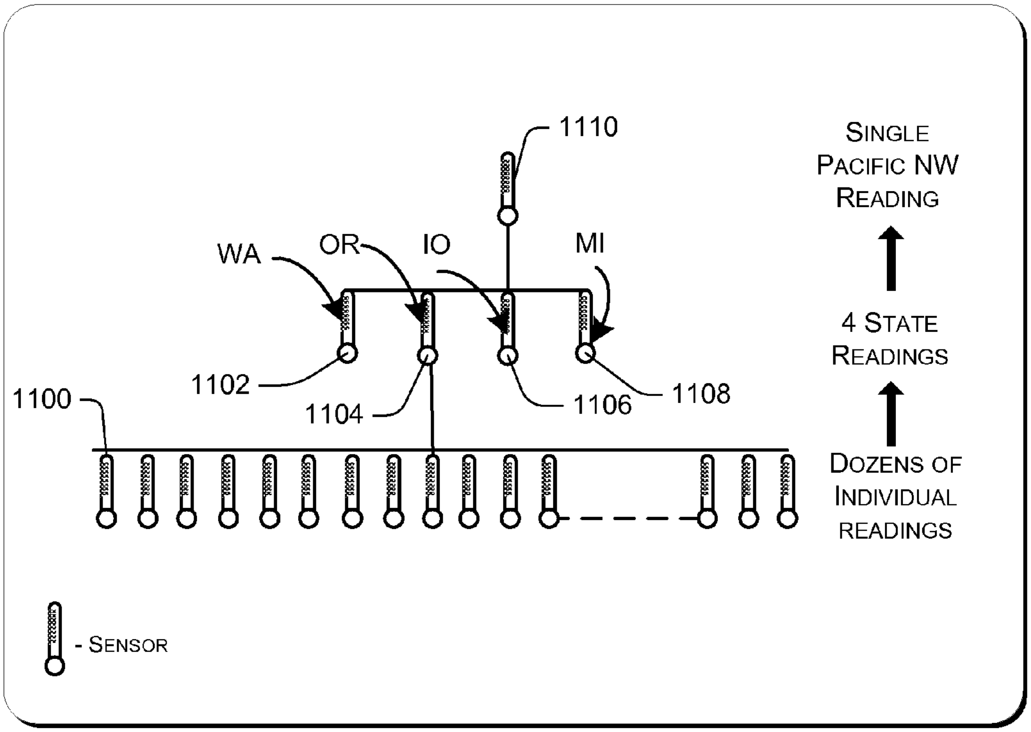
FIG. 11 illustrates an exemplary embodiment of senseweb in which values from several data sources are clustered into a single value.

FIG. 11 shows how icons, and the sensor information with which they are associated, can be clustered together. In this instance, the icons are thermometers, indicating, for example, that sensors associated with the icons are monitoring a temperature condition. It will be understood, however, that is this is for the sake of illustration and not limitation. The data of any types of sensors, reporting any types of data, can be clustered where an aggregated data value for a plurality of sensors may provide some useful information.

In the case of temperature sensors, as illustrated in FIG. 11, the number of sensors in each state in the Pacific Northwest may number in the dozens, hundreds or thousands. Thus if each sensor were represented by its own icon on a map such as the map 1000 in FIG. 10, the icons would overwhelm the map 1000, obscuring other relevant data presented by the map 1000, such as roadways, terrain features, towns and cities, and landmarks. Moreover, the icons would be so tightly packed, that it would be difficult or impossible for a user to isolate and interact with individual icons associated with sensors of interest. Moreover, the presentation afforded by so many icons might present too much data for users who are not concerned with temperatures of individual geographic points, but rather would like to see broader, regional temperature information.

For these and other reasons, adjacent sensors may be clustered together, and the data they measure may be combined into a single aggregated value. For example, the temperatures from each sensor in a clustered group may be used to find an average or a mean value from the group.

In one implementation, to determine which of a plurality of sensors should be aggregated, techniques such as employing a hierarchical triangular mesh may be used to effect clustering. The hierarchical triangular mesh technique, which is known in the context of data sorting, may be adapted to determine which of a plurality of sensors be aggregated to present one, composite sensor representation and reading. Hierarchical triangular mesh, generally used for sorting data, is adaptable to determine an appropriate grouping of sensors based on the number of available sensors combined with the relative size of the representation of the region of interest. Appropriately grouped sensor readings are averaged, and the averaged result presented as a representative reading for the aggregated sensors.

Still referring to FIG. 11, a plurality of sensors 1100 in Washington state may be clustered to arrive at a single clustered data value 1102. Similarly, pluralities of sensors from other states in the Pacific Northwest may be clustered to arrive at clustered data values 1104, 1106, 1108 for those states as well. These clustered data values 1102, 1104, 1106, 1108 may be further clustered to arrive at a clustered data value 1110 for the entire Pacific Northwest, which can be associated with a single icon on a representation, such as icon 1002(*a*) in FIG. 10. A clustered data value, such as clustered data value 1110 can allow a user to see a broad temperature for the Pacific Northwest region of the United States instead of having to suffer through a confusing and cluttered presentation of hundreds or thousands of icons which would result if each sensor measuring temperature in the Pacific Northwest was included in the representation.

It should be noted the clustering of sensors can be done automatically based on the zoom level applied to a representation of the region of interest, such as a map. For example, rules can be set regulating the number of icons which can be found in a given square inch of map space. In such an instance, when a user zooms in on a specific geographical location on a map including a representation of a region of interest, the clustering relationship may change, and the sensors found in the cluster may decrease. Similarly, when a user zooms out from a map including a representation of a region of interest, clustering may increase and more sensors may be clustered into a single icon, in order to accommodate the presentation of data from the greater number of sensors that are brought into the area of the representation.

It will also be understood, that users may be afforded the option of unclustering data from an icon. For example, a user interacting with an icon representing clustered sensor data, such as icon 1002(*a*) in FIG. 10, may be presented with the option of viewing a separate presentation of the portion of the region of interest in which the sensors clustered in icon 1002 (*a*) are monitoring conditions. In the case of sensor 1002(*a*), this separate presentation could include a new window including a map of the Pacific Northwest in which all of the sensors clustered in icon 1002(*a*) are associated with their own icons, or with icons indicating a lower level of clustering (i.e. each icon in the new window represents a clustering of 100 sensors, rather than, for example, a clustering of 1000 sensors in icon 1002(*a*)).

Exemplary User Interface Screen

Figure 12:
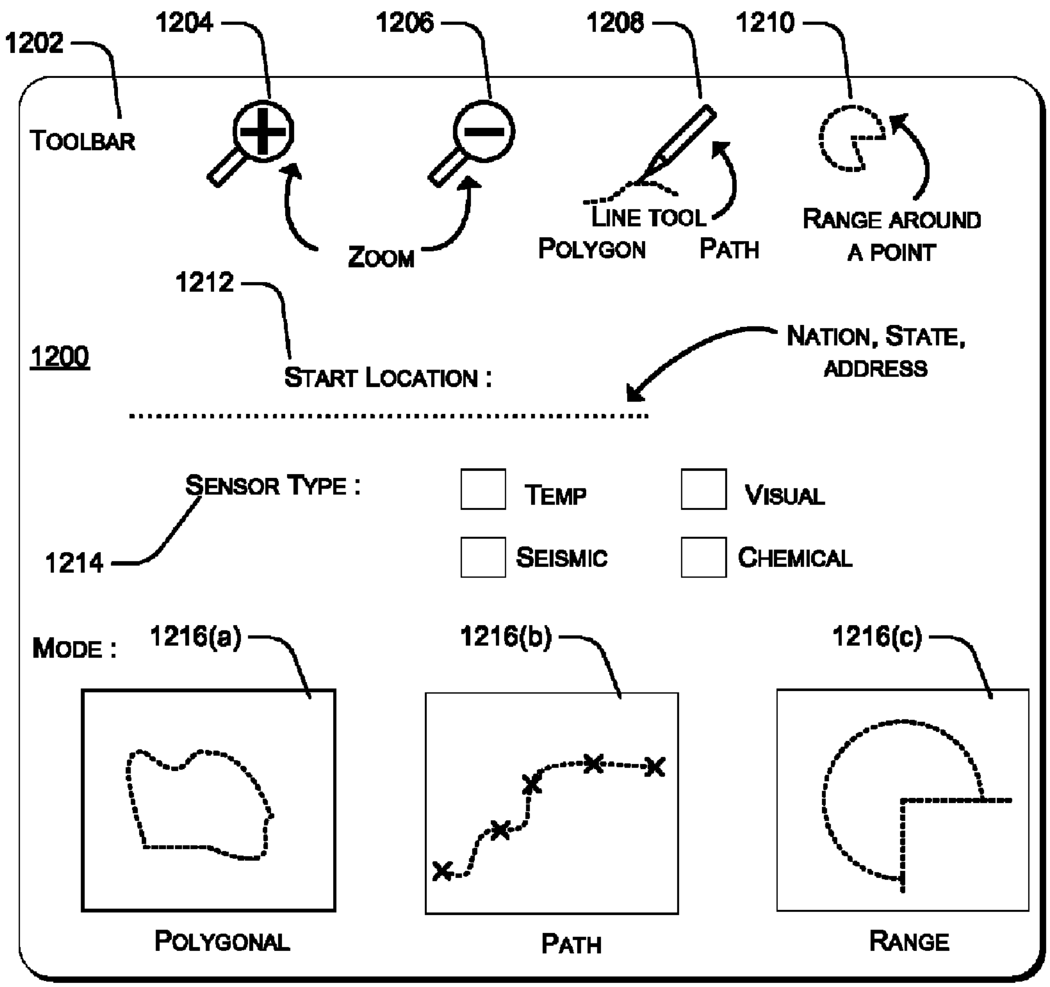
FIG. 12 illustrates an exemplary user interface in which embodiments of senseweb can be implemented.

FIG. 12 illustrates an exemplary user interface screen that can be used with embodiments of Senseweb. The screen 1200 can include a toolbar 1202 including various interaction tools, such as zoom icons 1204 and 1206 that allow a user to zoom in and zoom out of a representation of a region of interest. By way of further example, a line tool 1208 allows a user to form a line, path or polygonal area on a representation of a region of interest. The toolbar 1202 may also include other tools, such as a radial expander 1210 allowing a user to indicate how large of a radius from a given point should be to define a region of interest.

In addition to the toolbar 1202, a screen 1200 can also include data fields such as a start location field 1212 allowing a user to enter geographical point information, such as a geographical coordinate, a street address, the intersection of two streets, a landmark, and so on. The screen 1200 can also include buttons enabling a user to select from presented information. For example, a sensor type buttons 1214 can be presented that allow a user to select from certain types of available sensors including, for example, such as temperature sensors, seismic sensors, visual sensors, chemical sensors.

The screen 1200 can also include mode buttons 1216, allowing a user, for example, to change the functionality of other buttons, and pull down menus found on screen 1200. For example, by selecting polygonal button 1216(*a*), the user may change the function of the line tool 1208 such that the user may use the line tool 1208 to click a point in a representation and then form a polygonal area by dragging the line representation tool 1208. Similarly, by clicking a button 1216 (*b*) a user may be allowed to use the line tool 1208 to define a path across a representation by clicking successive points on the representation. Moreover, by clicking range button 1216 (*c*), the user may be allowed to employ the line tool 1208 to define a point as well as boundary limits from that point (such as those discussed, for example, in conjunction with FIG. 6). Alternately, by clicking the button 1216(*c*), a user may be allowed to designate a desired region of interest by selecting a point on the representation as well as a range around the point.

Exemplary Method for Registering Sensors

Figure 13:
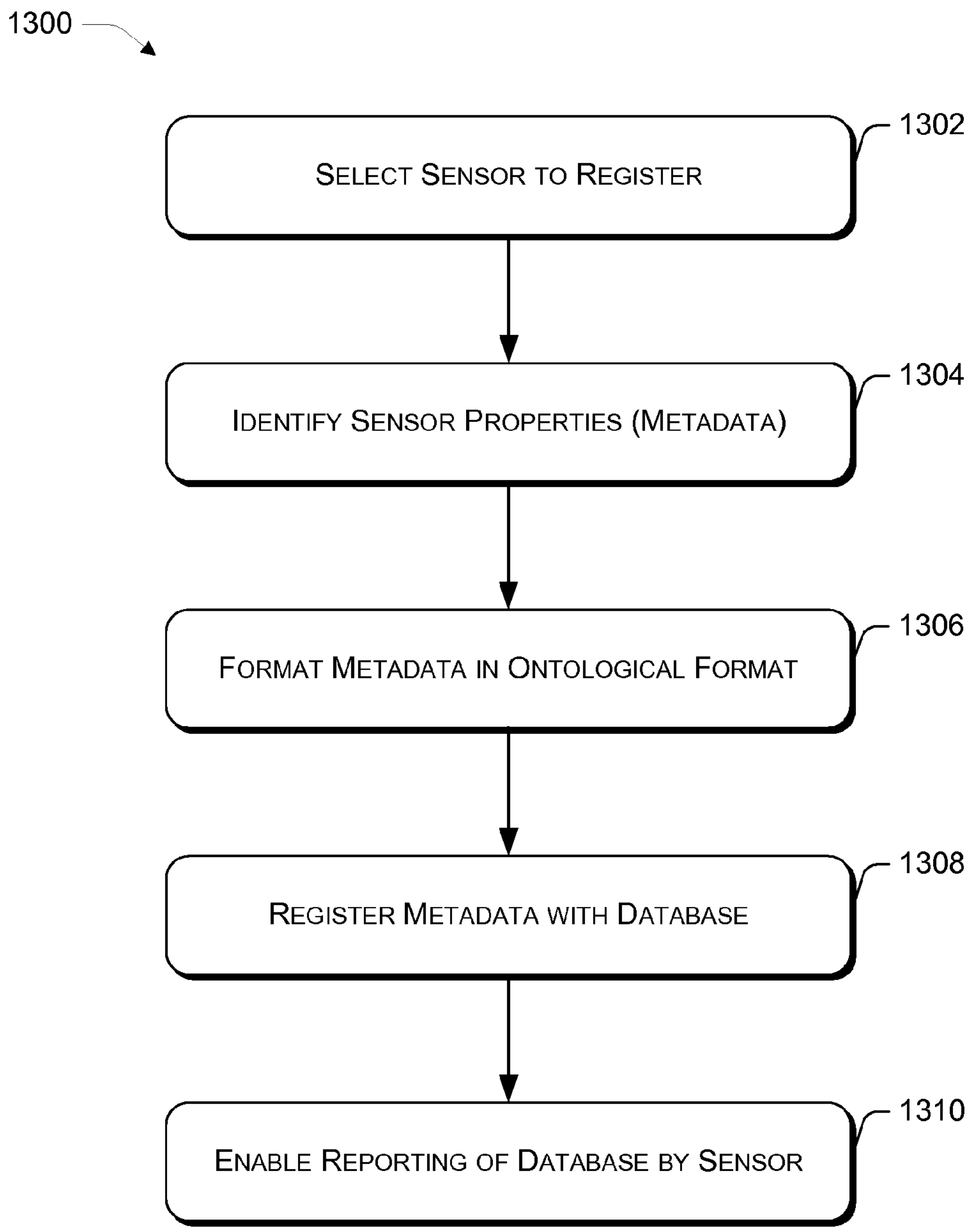
FIG. 13 illustrates an exemplary method for registration of sensors in which embodiments of senseweb can be implemented.

FIG. 13 illustrates an exemplary method 1300 for the registration of sensors and is described with reference to the exemplary elements shown in FIGS. 1-12. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 1302, a sensor to be registered is selected. For example, the sensor may be one of the sensors 102, and can monitor one or more conditions, such as air temperature, traffic density, chemical concentrations, and so on.

At block 1304, sensor properties are identified. These properties can include the location, address, composition, type, make, model of the sensor as well as the one or more conditions being monitored by the sensor and the manner or technique in which the monitoring is accomplished. In one exemplary embodiment, some or all of the sensor properties may be recorded in metadata.

At block 1306, metadata for the sensor, if present, is formatted in an ontological format that describes the nature of the sensor, as previously described. At block 1308, metadata from the sensor is registered with a database. In one exemplary implementation, this database may be the GeoDB 108. In another possible implementation, the metadata can be registered at another server or database electrically coupled to the sensor, such as the server/aggregator 106, the sensor cache 112 or the servers 100 or 114. Registration of the metadata for each sensor can be accomplished through the use of records. Additionally, metadata can be grouped into directories, with each directory providing information regarding the sensor, such as a location or address of the sensor, and at least one condition being monitored by the sensor. Groups of such directories may be compiled by registering the location and/or address of each sensor as well as at the condition(s) being monitored by the sensor.

At block 1310, the sensor can be enabled to report data. For example, in one possible implementation, various devices, such as the server/aggregator 106 and/or the client 100 may be given the location and/or address of the sensor through the metadata from the sensor. This can enable server/aggregator 106 and the client 100 to contact the sensor directly and query it for data being collected regarding the condition being monitored. In an alternate embodiment, the sensor may be polled by a device, such as the sensor cache 112 using the sensor's metadata to locate the sensor. The sensor cache 112 may then be queried by devices such as the server/aggregator 106 and the client 100 in order to access recent and/or historical data retrieved from the sensor.

Exemplary Method for Query Processing

Figure 14:
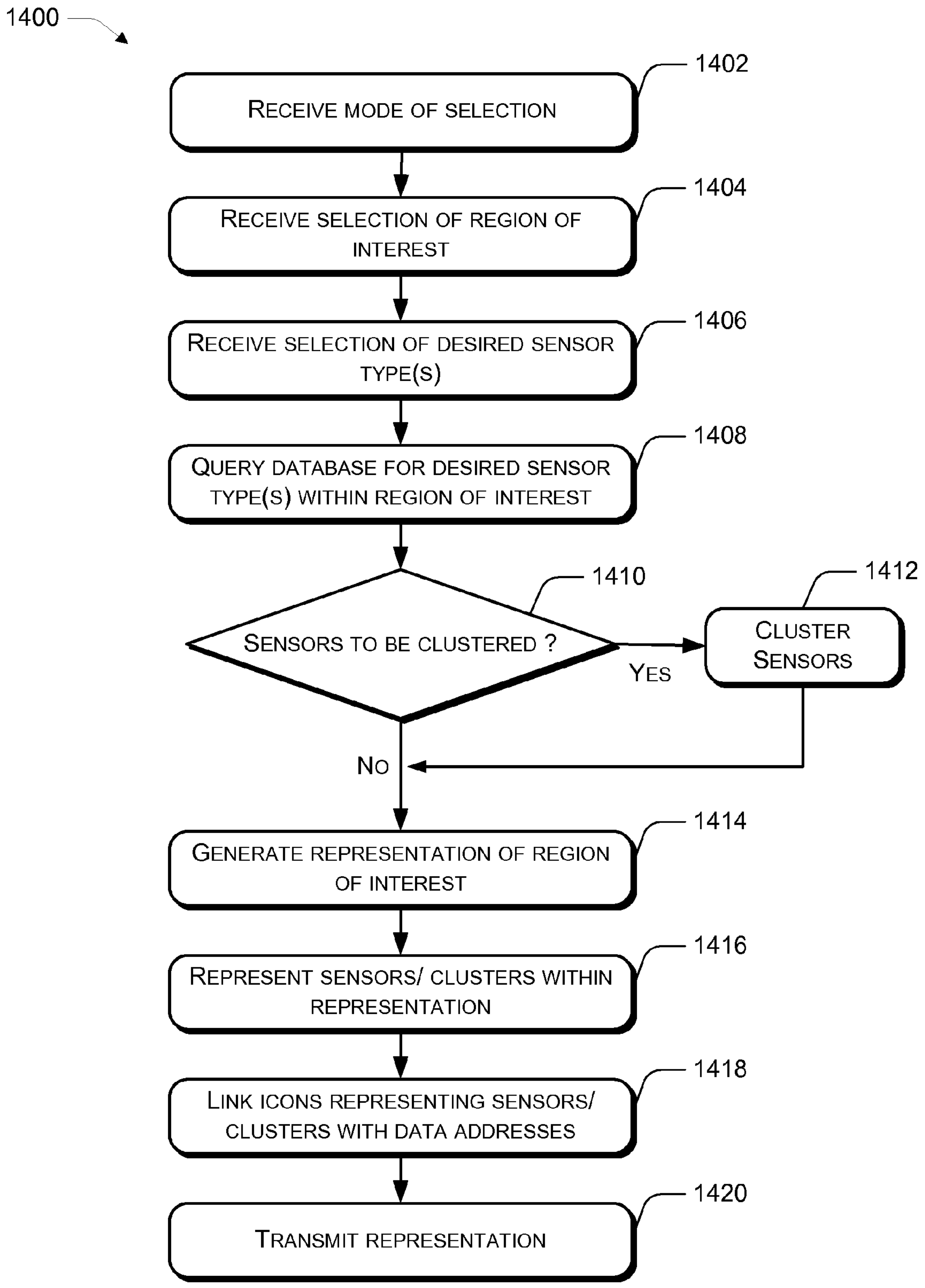
FIG. 14 illustrates an exemplary method for query processing in which embodiments of senseweb can be implemented.

FIG. 14 illustrates an exemplary method 1400 for query processing and is described with reference to the exemplary elements shown in FIGS. 1-12. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 1402, a mode of selection is received. For example, a user can decide whether to enter information using one or more graphic interfaces (such as those illustrated in FIGS. 3-6) or one or more textual interfaces (such as those show in FIGS. 7 and 12). Alternately, a user can decide to use a combination of graphic and/or textual interfaces. The user's selection can be received via an interface device, such as the client 100.

At block 1404 a selection of a region of interest may is received. In one implementation, a user can enter this information through a device such as the client 100 using the mode of selection chosen at the block 1402. Often the region of interest is a geographic area in which data is sought by a user.

At block 1406 a selection of one or more desired sensor types is received. In one implementation, a user can enter this information through a device such as the client 100 using the mode of selection chosen at the block 1402. Information regarding the desired type of the one or more sensors may include a desired condition being monitored by the sensors, a technology being used to measure and or report the condition, and/or the make or model of the sensor.

At block 1408 a database which might include data regarding the presence, location, address and types of sensors available is queried to find all sensors in the region of interest and of the type specified in the blocks 1404 and 1406. In one implementation a database, such as the GeoDB 108, is queried and metadata included within the database is searched. This metadata can be in the form of records, and the metadata may be grouped into directories, with each directory providing sensor information, such as a location or address of the sensor, and at least one condition being monitored by the sensor. Such directories may be compiled by registering the location and/or address of each sensor as well as the condition (s) being monitored by the sensor. Moreover, in one possible embodiment, a plurality of available sensors may be registered through the use of an ontological language specifying metadata describing each of the available sensors.

At block 1410, the quantity of sensors of the type desired in the region of interest is examined to determine if clustering is desired. In clustering, data and information from a plurality of sensors is combined into a single aggregated value using methods such as averaging, taking the mean, or hierarchical triangular mesh methods. In this way, overpopulation of a representation of the region of interest resulting from a plurality of icons or other information associated with each sensor of the desired type in the region of interest is avoided. The amount of population on a given representation can be preset, or it can be determined by a user. For example, a user can specify that no more than two icons representing sensors of the desired type can presented on any square inch of a representation of a region of interest. If ten sensors are found of the desired type in an area of such size, then these sensors can be clustered into one or two groups, represented by one or two icons, respectively.

If clustering is needed, it is performed at the block 1412, the "yes" path from the block 1410. Alternately, if the number of sensors in the region of interest is not such that unacceptable crowding or overpopulation of a representation of the region of interest will occur, then no clustering need by performed, the "no" path from the block 1410.

At block 1414 a generic representation of the region of interest is created. This representation can take a graphic form, such as a map, and can be created by various devices. In one exemplary implementation, the representation of the region of interest is created by the client 100. In another exemplary implementation, the representation is created by the server/aggregator 106.

At block 1416 sensors, or clusters of sensors, found in the region of interest and which are of the desired type, are represented within the representation of the region of interest created at the block 1414. Each sensor or cluster of sensors can be represented by an icon. In one implementation, icons can be graphically representative of the sensor type, or condition(s) being monitored by the sensor(s). For example, a temperature sensor may be represented by an icon resembling a thermometer. Similarly, a weather sensor may be represented by an icon resembling a cloud.

At block 1418 representations of sensors or clusters of sensors are linked with addresses or locations of the sensors. In this manner, for example, devices such as the server aggregator 106 and/or the client 100, can create a full representation of the region of interest along with icons corresponding to sensors of the desired type in the region of interest. The icons may be deliberately placed in the representation of the region of interest, such that the location of the icon corresponds to the physical location of the condition being monitored by the sensor or cluster of sensors represented by the icon.

The location and/or address links to the sensors, allow a user to interact with the icon and cause the information monitored by the icon to be retrieved from the sensor or any intermediate device caching data monitored by the sensor. For example, in one implementation an address link for a sensor may lead to the GeoDB 108 or the sensor cache 112 where data from the sensor is cached. User interaction effecting this data retrieval can include, for example, moving a cursor over an icon, or clicking the icon with the cursor. The data presented by such an interaction can include various data and metadata associated with the sensor or cluster of sensors represented by the icon, including the sensor type, information regarding condition(s) being measured by the sensor, and the time of that the information being monitored was collected. This information may be presented in a separate window.

It will also be understood that the term icon can include a window including various data, such as the sensor type, information regarding condition(s) being measured by the sensor, and the time of that the information being monitored was collected.

Icons can be linked to their respective sensors of data caches by one or more devices. For example, in one implementation linking can be done by the server/aggregator 106. In another possible implementation, linking can be done directly by the client 100.

At block 1420 a full representation of the region of interest, along with icons linked to their respective sensors or data sources is transmitted. In one implementation, transmission occurs to an output interface operable to receive the representation and graphically present the representation to the user. For example, the transmission can occur to the client 100, which can display the representation and icons to a user, and allow the user to interact with the representation and icons to view sensors and data of interest associated with the sensors.

Exemplary Computer Environment

Figure 15:
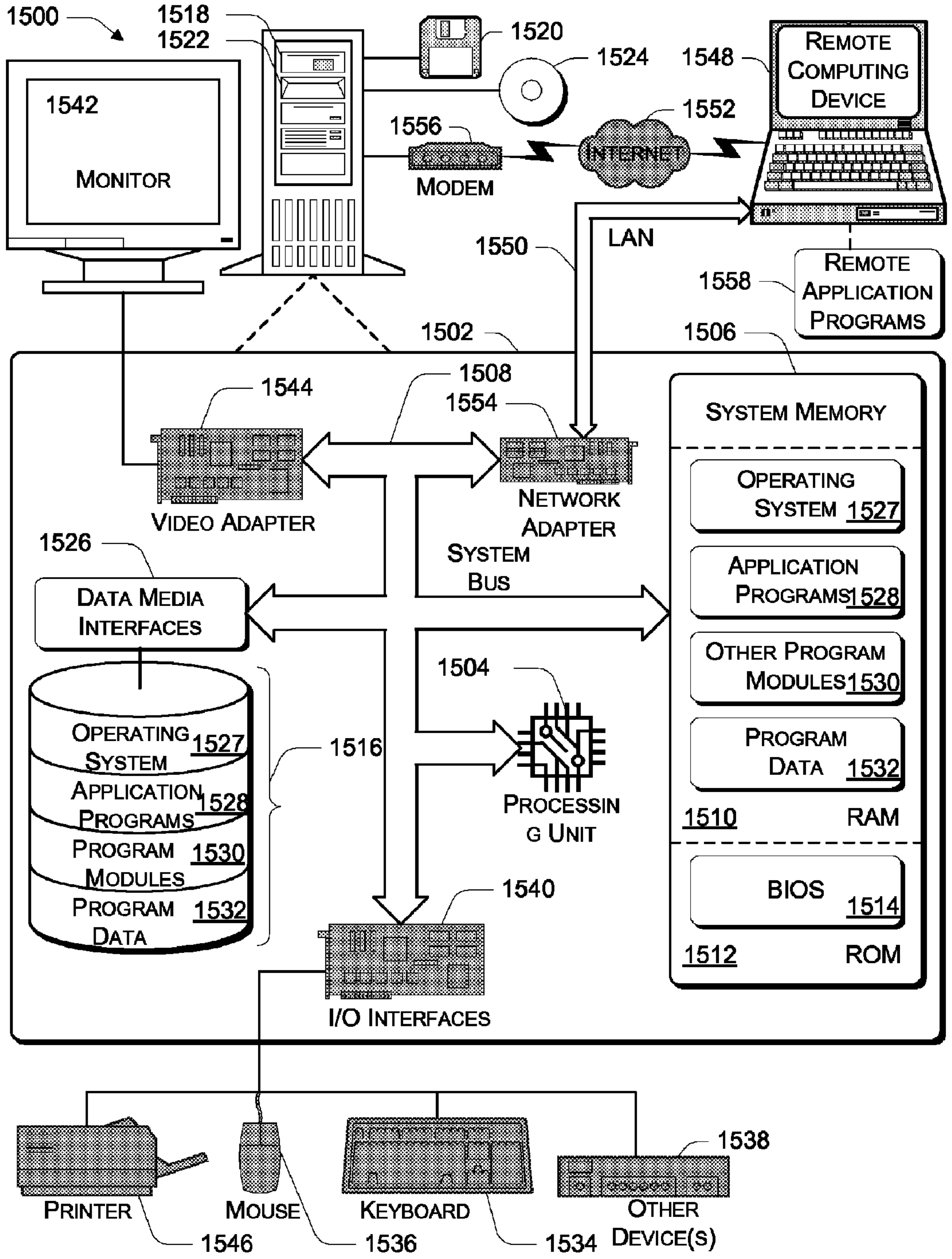
FIG. 15 illustrates an exemplary general computer environment in which embodiments of senseweb can be implemented.

FIG. 15 illustrates an example general computer environment 1500, which can be used to implement the techniques described herein, and which may be representative, in whole or in part, of elements described herein. The computer environment 1500 is only one example of a computing environment and is not intended to suggest any limitation as to the scope of use or functionality of the computer and network architectures. Neither should the computer environment 1500 be interpreted as having any dependency or requirement relating to any one or combination of components illustrated in the example computer environment 1500.

Computer environment 1500 includes a general-purpose computing device in the form of a computer 1502, which may include client 100 or server 106. Computer 1502 can be, for example, a desktop computer, a handheld computer, a notebook or laptop computer, portable device assistant (PDA), cell phone, a server computer, a game console, and so on. The components of computer 1502 can include, but are not limited to, one or more processors or processing units 1504, a system memory 1506, and a system bus 1508 that couples various system components including the processor 1504 to the system memory 1506.

The system bus 1508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

The computer 1502 typically includes a variety of computer readable media. Such media can be any available media that is accessible by the computer 1502 and includes both volatile and non-volatile media, removable and non-removable media.

The system memory 1506 includes computer readable media in the form of volatile memory, such as random access memory (RAM) 1510, and/or non-volatile memory, such as read only memory (ROM) 1512. A basic input/output system (BIOS) 1514, containing the basic routines that help to transfer information between elements within the computer 1502, such as during start-up, is stored in ROM 1512. RAM 1510 typically contains data and/or program modules that are immediately accessible to and/or presently operated on by the processing unit 1504.

The computer 1502 may also include other removable/non-removable, volatile/non-volatile computer storage media. By way of example, FIG. 15 illustrates a hard disk drive 1516 for reading from and writing to a non-removable, non-volatile magnetic media (not shown), a magnetic disk drive 1518 for reading from and writing to a removable, non-volatile magnetic disk 1520 (e.g., a "floppy disk"), and an optical disk drive 1522 for reading from and/or writing to a removable, non-volatile optical disk 1524 such as a CD-ROM, DVD-ROM, or other optical media. The hard disk drive 1516, magnetic disk drive 1518, and optical disk drive 1522 are each connected to the system bus 1508 by one or more data media interfaces 1526. Alternatively, the hard disk drive 1516, magnetic disk drive 1518, and optical disk drive 1522 can be connected to the system bus 1508 by one or more interfaces (not shown).

The disk drives and their associated computer-readable media provide non-volatile storage of computer readable instructions, data structures, program modules, and other data for the computer 1502. Although the example illustrates a hard disk 1516, a removable magnetic disk 1520, and a removable optical disk 1524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1516, the magnetic disk 1520, the optical disk 1524, ROM 1512, and/or RAM 1510, including by way of example, an operating system 1527, one or more application programs 1528, other program modules 1530, and program data 1532. Each of such operating system 1527, one or more application programs 1528, other program modules 1530, and program data 1532 (or some combination thereof) may implement all or part of the resident components that support the distributed file system.

A user can enter commands and information into computer 1502 via input devices such as a keyboard 1534 and a pointing device 1536 (e.g., a "mouse"). Other input devices 1538 (not shown specifically) may include a microphone, joystick, game pad, satellite dish, serial port, scanner, and/or the like. These and other input devices are connected to the processing unit 1504 via the input/output interfaces 1540 that are coupled to the system bus 1508, but may be connected by other interface and bus structures, such as a parallel port, game port, or a universal serial bus (USB).

A monitor 1542 or other type of display device can also be connected to the system bus 1508 via an interface, such as a video adapter 1544. In addition to the monitor 1542, other output peripheral devices can include components such as speakers (not shown) and a printer 1546 which can be connected to computer 1502 via the input/output interfaces 1540.

The computer 1502 can operate in a networked environment using logical connections to one or more remote computers, such as a remote computing device 1548. By way of example, the remote computing device 1548 can be a personal computer, portable computer, a server, a router, a network computer, a peer device or other common network node, and the like. The remote computing device 1548 is illustrated as a portable computer that can include many or all of the elements and features described herein relative to the computer 1502.

Logical connections between the computer 1502 and the remote computer 1548 are depicted as a local area network (LAN) 1550 and a general wide area network (WAN) 1552. Such networking environments are commonplace in offices, enterprise-wide computer networks, intranets, and the Internet.

When implemented in a LAN networking environment, the computer 1502 is connected to a local network 1550 via a network interface or adapter 1554. When implemented in a WAN networking environment, the computer 1502 typically includes a modem 1556 or other means for establishing communications over the wide network 1552. The modem 1556, which can be internal or external to the computer 1502, can be connected to the system bus 1508 via the input/output interfaces 1540 or other appropriate mechanisms. It is to be appreciated that the illustrated network connections are exemplary and that other means of establishing communication link(s) between the computers 1502 and 1548 can be employed.

In a networked environment, such as that illustrated with computing environment 1500, program modules depicted relative to the computer 1502, or portions thereof, may be stored in a remote memory storage device. By way of example, remote application programs 1558 reside on a memory device of remote computer 1548. For purposes of illustration, application programs and other executable program components such as the operating system are illustrated herein as discrete blocks, although it is recognized that such programs and components reside at various times in different storage components of the computing device 1502, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although embodiments of Senseweb have been described in language specific to structural features and/or methods, it is to be understood that the appended claims are not necessarily limited to the specific features or methods described. Rather, the specific features and methods are disclosed as exemplary implementations of Senseweb.

The invention claimed is:

1. A computer implemented method, comprising:

recognizing a first selection identifying a region of interest;

recognizing a second selection indicating at least one selected condition potentially monitored within the region of interest;

providing an indication to identify at least one sensor in the region of interest monitoring the selected condition;

displaying a representation of the region of interest on a display;

based on number of the at least one sensor and a relative size of the representation of the region of interest, grouping the at least one sensors into one or more groups by employing a hierarchical triangular mesh technique;

presenting a grouped sensor reading for each of the one or more groups within the representation of the region of interest; and upon moving a cursor over the presentation of the at least one sensor or clicking the presentation of the at least one sensor with the cursor, effectuating a retrieval of data that is associated with the at least one selected condition from the at least one sensor.

2. The method of claim 1 further comprising:

receiving data communicating the at least one selected condition from the at least one sensor; and automatically associating data communicating the at least one selected condition with a client electronic device simultaneously with a visual representation of the region of interest.

3. The method of claim 2 further comprising continuously updating an indication of the at least one selected condition while simultaneously providing the visual representation on a display of the client electronic device.

4. A method of claim 1, wherein an entry of the first selection of the region of interest includes receiving one of a plurality of entries comprising:

a polygonal definition circumscribing the region of interest from a representation of an area including the region of interest;

a path definition defining the region of interest as coinciding with at least one of along or adjacent to at least one line segment across the area;

a range definition representing the region of interest as including a subset of the area within a distance of a point within the area;

a perspective definition representing the region of interest as including a subset of the area defined by a point of origin and at least one boundary limit; and a textual reference indicating the region of interest.

5. A method of claim 1, wherein the selected condition potentially monitored includes one of:

a visual observation presented by a camera, the visual observation including data captured at least one of within a human visual spectrum or beyond the human visual spectrum;

an audio condition, including at least one of:
- a sound; or
- a sound level;

a weather condition, including at least one of:
- an air temperature;
- a humidity;
- a barometric pressure;
- a wind speed; or
- an accumulated precipitation;

a light density condition;

a geological condition, including at least one of:
- a seismographic condition; or
- a ground temperature;

a chemical condition including at least one of:
- a presence of the chemical;
- an absence of the chemical; or
- a relative measurement of a density of the chemical; and a traffic condition; or a density condition counting a presence of a selected entity.

6. A method of claim 1, wherein providing an indication to identify at least one sensor includes indicating a directory of sensors, the directory including for each of the sensors a location and at least one condition monitored.

7. A method of claim 6, further comprising compiling the directory of sensors by registering for each of a plurality of available sensors the location of and the at least one condition monitored by each of the available sensors.

8. A method of claim 7, further comprising registering each of the plurality of available sensors using an ontological language specifying metadata describing each of the available sensors.

9. A method of claim 8, wherein the metadata describing each of the available sensors includes at least one of:

a name;

a physical location defined by at least one coordinate designation;

a property address where the available sensor is located;

a sensor type;

a data type describing a parameter of data monitored by the available sensor; or a description of the sensor.

10. A method of claim 8, wherein the directory of sensors is configured to maintain a network address for each of the plurality of sensors from which the data reported by each of the plurality of sensors is available, including one of:

a sensor address from which the data presented by the sensor can be retrieved; or a hub address of a computer system in which the data represented by the sensor is stored and from which the data can be retrieved.

11. A method of claim 1, wherein associating the data with the representation includes at least one of:

representing the at least one sensor as an icon, wherein a position of the icon within the representation of the region of interest indicates a relative position of the at least one sensor within the region of interest; or representing the selected condition reported by the at least one sensor on the representation of the region of interest at the relative position of the at least one sensor within the region of interest.

12. A method of claim 1, wherein the data communicating the selected condition includes at least one of:

a measurement of the selected condition; or a time at which the measurement was made.

13. A system, comprising:

a database including a directory of a plurality of sensors, each of the sensors being configured to monitor at least one condition;

a query manager configured to receive a query including an identification of a region of interest and at least one selected condition, identify within the region of interest available sensors of the plurality of sensors operable to monitor the selected condition, and group the available sensors within the region of interest into one or more groups by employing a hierarchical triangular mesh technique based on number of the available sensors and a relative size of a representation of the region of interest;

an integrator that generates the representation of the region of interest that represents each of the one or more groups reporting the selected condition within the region of interest;

an associator that automatically links the representation with a data address from which the condition reported by each of the sensors is available; and a client interface including:

an output interface configured to:

receive the representation and graphically present the representation;

display a data window including data associated with the selected condition reported by the senor when placing a cursor over a representation of the sensor or clicking the representation of the sensor with the cursor; and collapse the data window when moving the cursor away from the representation of the sensor or clicking the representation of the sensor or the data window with the cursor.

14. A system of claim 13, further comprising a client interface including:

a query input allowing a user to specify the region of interest and the at least one condition.

15. A system of claim 14, wherein the query input includes a user input operable to allow the user to identify the region of interest, including one of:

graphically specifying a polygonal boundary of the region of interest within an area including the region of interest;

graphically specifying a path for which the region of interest lies at least one of along the path or adjacent to the path;

graphically specifying a range for which the region of interest includes a zone within a distance of a specified point;

graphically specifying a perspective relative to a selected point of origin and limited by at least one boundary; or textually describing the region of interest.

16. A system of claim 15, wherein the database includes queriable metadata describing each of the sensors, wherein for each of the sensors the metadata includes at least one of:

a name;

a physical location defined by at least one coordinate designation;

a property address where the available sensor is located;

a sensor type;

a data type describing a parameter of data monitored by the available sensor; or a description of the sensor.

17. A system of claim 13, wherein the data reported by each of the sensors includes at least one of:

a measurement of the selected condition; and a time at which the measurement was made, and wherein the data reported by each of the sensors is retrievable from a data address including one of:

a sensor address from which the data presented by the sensor can be retrieved; or a hub address of a computer system in which the data represented by the sensor is stored and from which the data can be retrieved.

18. A computer-readable medium storing a plurality of computer executable instructions that when executed on a processor perform acts comprising:

receiving a query identifying a region of interest and at least one condition to be reported within the region of interest;

identifying one or more available sensors that report the at least one condition within the region of interest;

generating a representation of the region of interest;

based on number of the available sensors and a relative size of the representation of the region of interest, grouping the available sensors into one or more groups by employing a hierarchical triangular mesh technique;

obtaining a grouped sensor reading for each of the one or more groups; and presenting the grouped sensor reading for each of the one or more groups within the representation of the region of interest.

19. A computer-readable medium of claim 18, wherein the acts further comprise:

allowing a user to specify the region of interest and the at least one condition; and graphically presenting the representation of the region of the interest to the user.

20. A computer-readable medium of claim 18, wherein the acts further comprise:

maintaining queriable metadata describing a plurality of sensors;

recognizing an ontological language specifying the queriable metadata for the plurality of sensors; and specifying for each of the plurality of sensors at least one of:

a name;

a physical location defined by at least one coordinate designation;

a property address where the sensor is located;

a sensor type;

a data type describing a parameter of data monitored by the sensor; and a description of the sensor.

* * * * *